United States Patent
Conn

(10) Patent No.: US 8,944,090 B1
(45) Date of Patent: Feb. 3, 2015

(54) AUTOMATED PRESSURE REGULATED WATER DIVERSION SYSTEM

(71) Applicant: Dominic Conn, Tempe, AZ (US)

(72) Inventor: Dominic Conn, Tempe, AZ (US)

(73) Assignee: GSG Holdings, Inc., Chandler, AZ (US)

( * ) Notice: Subject to any disclaimer, the term of this patent is extended or adjusted under 35 U.S.C. 154(b) by 232 days.

(21) Appl. No.: 13/677,040

(22) Filed: Nov. 14, 2012

Related U.S. Application Data

(60) Provisional application No. 61/560,138, filed on Nov. 15, 2011.

(51) Int. Cl.
  *G05D 11/00* (2006.01)
  *F16K 27/00* (2006.01)
  *F04B 23/00* (2006.01)

(52) U.S. Cl.
  CPC .............. *F16K 27/00* (2013.01); *F04B 23/00* (2013.01)
  USPC .................... 137/119.08; 137/489.5; 137/883; 137/885; 137/627

(58) Field of Classification Search
  USPC ............. 137/115.13, 115.23, 118.06, 119.01, 137/119.08, 488, 489.5, 512, 512.3, 627, 137/861, 877, 883, 885
  See application file for complete search history.

(56) References Cited

U.S. PATENT DOCUMENTS

| | | | | |
|---|---|---|---|---|
| 1,184,761 A * | 5/1916 | Lytton | ........................ | 137/489.5 |
| 4,883,084 A * | 11/1989 | Walter | ...................... | 137/118.06 |
| 5,293,746 A * | 3/1994 | Bianchetta | ...................... | 60/435 |
| 6,889,709 B2 * | 5/2005 | Hanada et al. | ................ | 137/606 |
| 8,820,345 B2 * | 9/2014 | Gergaud et al. | .......... | 137/118.06 |

* cited by examiner

*Primary Examiner* — John K Fristoe, Jr.
*Assistant Examiner* — R. K. Arundale
(74) *Attorney, Agent, or Firm* — Booth Udall Fuller, PLC

(57) ABSTRACT

A bypass valve assembly for use with a multi-speed pool pump is disclosed. The bypass valve assembly includes a housing having a inlet port, a high-pressure (HP) with a HP canal opening between the inlet port and the HP port, and a low-pressure (LP) port with a LP canal opening between the inlet port and the LP port. The bypass valve assembly also includes a HP valve assembly within the housing. The HP valve assembly includes a high-pressure seal movable between a HP sealed position responsive to a LP head and a HP open position responsive to a LP head. The bypass valve assembly also includes a LP valve assembly comprising a LP seal movable between a LP sealed position that seals the LP canal opening responsive to a HP head and a LP open position responsive to a LP head.

19 Claims, 4 Drawing Sheets

AUTOMATED PRESSURE REGULATED WATER DIVERSION SYSTEM

CROSS REFERENCE TO RELATED APPLICATIONS

This document claims the benefit of the filing date of U.S. Provisional Patent Application 31/560,138, entitled "Automated Pressure Regulated Water Diversion System" to Conn which was filed on Nov. 15, 2011, the contents of which are hereby incorporated by reference.

BACKGROUND

1. Technical Field

Aspects of this document relate generally to valve assemblies for pool pump systems.

2. Background Art

In an effort to save energy, many states have recently enacted new energy standards and codes that require multi-speed water pumps for use with swimming pool filtration systems. In theory, these multispeed pumps save electricity. Multi-speed pumps, however, are problematic to cleaning systems specifically designed to run on either a high-pressure head or a low-pressure head—not both. Non-limiting examples of cleaning systems typically designed to run on high-pressure heads include rotating pop-up head (nozzles) cleaners mounted in either the floor or wall and of ratcheting and non-ratcheting type, and pressure-side cleaners. In-floor cleaning systems can cause frequent fluctuations in head pressure as they switch from zone to zone. In particular, devices requiring a low-pressure head do not work with the high-pressure head and may be damaged by a high-pressure head.

Water features are an example of pool features that operate on a low-head pressure. Some water features have delicate features or are constructed to run on lower flows at a low-pressure head. The low speeds of the new multispeed pumps enable these features to be run efficiently. However, manual daily attention or expensive automated controls and valves may be required to shut-off water features with delicate features while the pump system runs a high-pressure head in-floor cleaning system when the pump is turned up to high speed. The water features can become damaged if the pressure is allowed to fluctuate cyclically with the in-floor system and the changes in head pressure will widely vary the affect being presented by the device.

Chlorinators are an example of a device for which regularly fluctuating pressure can cause problems. Some chlorinators rely on an air bubble to keep tabs dry until lower tabs erode. Fluctuating pressures that occur with multispeed pumps or in-floor cleaning systems compress and decompress the air bubbles causing the tabs to repeatedly flood and drain. This ultimately erodes that tabs and can significantly reduce their life and over chlorinate a swimming pool or other water feature.

Many pool cleaning systems like pop-up in-floor and pop-up wall heads (nozzles), whether stationary or rotating, or robotic or other pressure side devices are designed to run on high head pressure which is required to lift the heads (nozzles) in the floor and generate the cleaning jets and/or to propel them around the pool. When the pump is in low-pressure head mode the heads (nozzles) in the floor can become damaged by being only partially lifted. Also the control valves that direct water to the in-floor cleaner heads (nozzles) and the robot cleaners themselves are subjected to extended run times that are not enough to effectively actuate them but will wear out their drive mechanisms prematurely due to the low speed pumps running extended hours in low speed filtration cycles.

SUMMARY

Aspects and applications of the disclosure presented herein are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

In one aspect, this document features a bypass valve assembly for use with a multi-speed pool pump. The bypass valve assembly comprises a housing, a high-pressure (HP) valve assembly, and a low-pressure (LP) valve assembly. The housing comprises an inlet port, a HP port with a HP canal opening between the HP port and the inlet port, and a LP port with a LP canal opening between the LP port and inlet port. The HP valve assembly is within the housing and comprises a HP seal movable between a HP sealed position that seals the HP canal opening and a HP open position that unseals the HP canal opening, a HP stem coupled to the HP seal, a HP diaphragm coupled to the HP stem opposite the HP seal, and a HP valve chamber adjacent the HP diaphragm, the HP diaphragm moving the HP seal from the HP sealed position to the HP open position responsive to pressure in the HP valve chamber. The LP valve assembly comprises a LP seal movable between a LP sealed position and a LP open position, the LP sealed position sealing the LP canal opening with the LP seal responsive to a HP head. The bypass valve assembly also comprises a HP channel extending from the inlet port to the HP valve chamber. The bypass valve assembly also comprises a HP actuator comprising a plug positioned on the housing to plug the HP channel responsive to the LP head and movable to allow fluid communication between the valve chamber and the inlet port responsive to the HP head.

Particular embodiments may comprise one or more of the following. The HP actuator may further comprise a HP attractor, a HP magnet, and a HP spring positioned to hold the plug in the HP channel responsive to the LP head. The LP valve assembly may comprise a bypass receiver comprising a valve sleeve and valve seat coupled to the valve sleeve, the valve sleeve comprising an inner lip and the LP canal opening being positioned on the valve seat, a LP valve comprising the LP seal and a plunger shaft coupled to the LP seal and slidable within the valve sleeve, the LP seal shaped to abut valve seat in the LP sealed position, a spring surrounding a portion of the plunger shaft and positioned between the inner lip and the plunger, the spring configured to bias the plunger away from the valve seat, wherein the spring biases the LP seal to the open position responsive to the LP head and the LP seal partially collapses the spring to seal the LP canal opening responsive to the HP head. The LP valve assembly may also be coupled to a LP cover and further comprise two valve guides coupled to the LP cover, a bypass magnet coupled to the LP cover between the two valve guides, and a bypass attractor coupled to the plunger shaft opposite the LP seal. The bypass magnet and attractor may be adjustable. The LP valve assembly may further comprise a bypass port in fluid communication with the inlet port, a LP stem coupled to the LP seal, a LP diaphragm coupled to the stem opposite the LP seal, and a LP valve chamber adjacent the LP diaphragm, the LP diaphragm moving the LP seal from the LP sealed position to the LP open position responsive to pressure in the LP valve chamber, a LP channel extending from the bypass port to the LP valve chamber, and a LP actuator comprising a plug positioned on the housing to plug the LP channel responsive to the LP head and movable to allow fluid communication between the LP valve chamber and the bypass port responsive to the HP head. The LP actuator may comprise an LP attractor, a LP magnet, and a LP spring positioned to hold the plug in the LP channel responsive to the LP head. The LP valve assembly may comprise a LP stem coupled to the LP seal and the HP seal on opposing ends of the stem.

In another aspect, this document features a multi-speed pool pump system that comprises a multi-speed pool pump and a bypass valve assembly. The multi-speed pool pump is configured to pump water at a HP head and a LP head. The bypass valve assembly comprises a housing, a HP valve assembly, and a LP valve assembly. The housing comprises an inlet port in fluid communication with the multi-speed pool pump, a HP port with a HP canal opening between the HP port and the inlet port, and a LP port with a LP canal opening between the LP port and the inlet port. The HP valve assembly is within the housing and comprises a HP seal movable between a HP sealed position that seals the HP canal opening and a HP open position the unseals the HP canal opening, a HP stem coupled to the HP seal, a HP diaphragm coupled to the HP stem opposite the HP seal, and a HP valve chamber adjacent the HP diaphragm, the HP diaphragm moving the HP seal from the HP sealed position to the HP open position responsive to pressure in the HP valve chamber. The LP valve assembly comprises a LP seal movable between a LP sealed position and a LP open position, the LP sealed position sealing the LP canal opening with the LP seal responsive to the HP head. The bypass valve assembly further comprises a HP channel extending from the inlet port to the HP valve chamber, and a HP actuator comprising a plug positioned on the housing to plug the HP channel responsive to the LP head and movable to allow fluid communication between the HP valve chamber and the inlet port responsive to the HP head. The system further comprises one or more LP devices in fluid communication with the LP port, and one or more HP devices in fluid communication with the HP port.

Particular embodiments of the multi-speed pool pump system may comprise one or more of the following. The HP actuator may comprise a HP attractor, a HP magnet, and a HP spring positioned to hold the plug in the HP channel responsive to the LP head. The LP valve assembly may comprise a bypass receiver comprising a valve sleeve and valve seat coupled to the valve sleeve, the valve sleeve comprising an inner lip and the LP canal opening being positioned on the valve seat, a LP valve comprising the LP seal and a plunger shaft coupled to the LP seal and slidable within the valve sleeve, the LP seal shaped to abut valve seat in the LP sealed position, a spring surrounding a portion of the plunger shaft and positioned between the inner lip and the plunger, the spring configured to bias the plunger away from the valve seat, wherein the spring biases the LP seal to the open position responsive to the LP head and the LP seal partially collapses the spring to seal the LP canal opening responsive to the HP head. The LP valve assembly may be coupled to a LP cover and further comprises two valve guides coupled to the LP cover, a magnet coupled to the LP cover between the two valve guides, and a bypass attractor coupled to the plunger shaft opposite the LP seal. The LP valve assembly may comprise a bypass port in fluid communication with the inlet port, a LP stem coupled to the LP seal, a LP diaphragm coupled to the stem opposite the LP seal, and a LP valve chamber adjacent the LP diaphragm, the LP diaphragm moving the LP seal from the LP sealed position to the LP open position responsive to pressure in the LP valve chamber, a LP channel extending from the bypass port to the LP valve chamber, and a LP actuator comprising a plug positioned on the housing to plug the LP channel responsive to the LP head and movable to allow fluid communication between the LP valve chamber and the bypass port responsive to the HP head. The LP actuator may comprise an LP attractor, a LP magnet, and a LP spring positioned to hold the plug in the LP channel responsive to the LP head. The LP valve assembly further may comprise a LP stem coupled to the LP seal and the HP seal on opposing ends of the stem.

In another aspect, this document features a bypass valve assembly for use with a multi-speed pool pump. The bypass valve assembly comprises a housing, a HP valve assembly, and a LP valve assembly. The housing comprises an inlet port, a HP port with a HP canal opening between the inlet port and the HP port, and a LP port with a LP canal opening between the inlet port and the LP port. The HP valve assembly is within the housing and comprises a HP seal movable between a high-pressure sealed position responsive to a LP head and a HP open position responsive to a LP head. The LP valve assembly comprises a LP seal movable between a LP sealed position that seals the LP canal opening responsive to a HP head and a LP open position responsive to a LP head.

Particular embodiments of the bypass valve assembly may comprise one or more of the following. The HP valve assembly may comprise a HP stem coupled to the HP seal, a HP diaphragm coupled to the HP stem opposite the HP seal, and a HP valve chamber adjacent the diaphragm, the diaphragm moving the HP seal from the HP sealed position to the HP open position responsive to pressure in the HP valve chamber. The bypass valve assembly may comprise a HP channel extending from the inlet port to the HP valve chamber and a HP actuator comprising a plug positioned on the housing to plug the HP channel responsive to the LP head and movable to allow fluid communication between the valve chamber and the inlet port responsive to the HP head. The LP valve assembly may comprise a bypass receiver comprising a valve sleeve and valve seat coupled to the valve sleeve, the valve sleeve comprising an inner lip and the LP canal opening being positioned on the valve seat. The LP valve assembly may comprise a LP valve comprising the LP seal and a plunger shaft coupled to the LP seal and slidable within the valve sleeve, the LP seal shaped to abut valve seat in the LP sealed position. The LP valve assembly may comprise a spring surrounding a portion of the plunger shaft and positioned between the inner lip and the plunger, the spring configured to bias the plunger away from the valve seat, wherein the spring biases the LP seal to the open position responsive to the LP head and the LP seal partially collapses the spring to seal the LP canal opening responsive to the HP head. The LP valve assembly may comprise a bypass port in fluid communication with the inlet port, a LP stem coupled to the LP seal, a LP diaphragm coupled to the stem opposite the LP seal, and a LP valve chamber adjacent the LP diaphragm, the LP diaphragm moving the LP seal from the LP sealed position to the LP open position responsive to pressure in the LP valve chamber, a LP channel extending from the bypass port to the LP valve chamber, and a LP actuator comprising a plug positioned on the housing to plug the LP channel responsive to the LP head and movable to allow fluid communication between the LP valve chamber and the bypass port responsive to the HP head. The LP valve assembly may comprise a LP stem coupled to the LP seal and the HP seal on opposing ends of the stem.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended embodiments and/or assembly or operation procedures will become apparent for use with embodiments from this disclosure. Accordingly, for example, although particular components are disclosed, such components may comprise any shape, size, style, type, model, version, measurement, concentration, material, quantity, and/or the like as is known in the art, consistent with the intended operation thereof.

Figure 1:
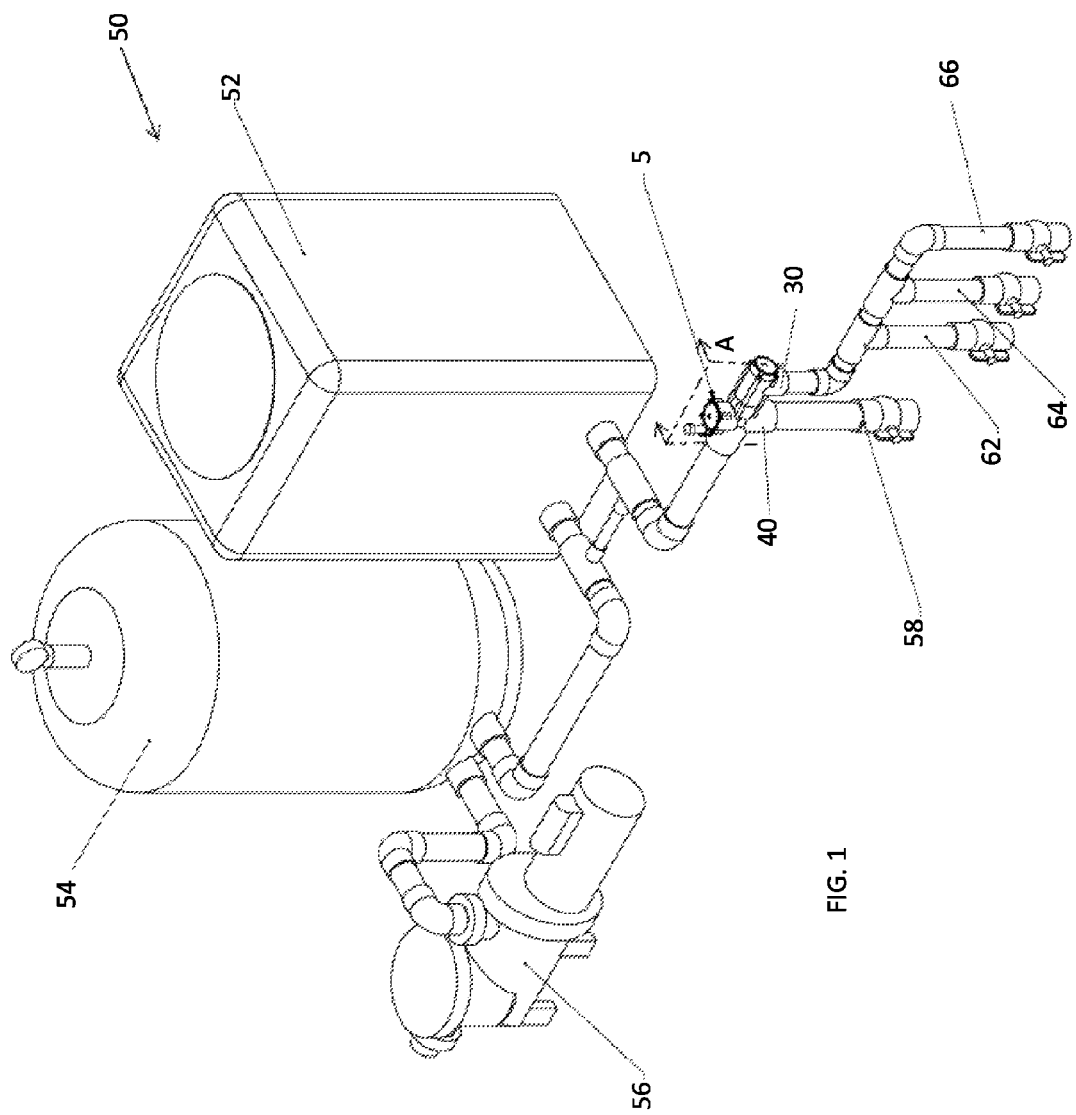
FIG. 1 is a perspective view of a pool pump system with a housing.

FIG. 1 illustrates an exemplary embodiment of an overall pump system 50. Regulations in various jurisdictions now require multi-speed pumps 56, but many related pool cleaning and other systems are not designed for multi-speed pumps resulting in less effective systems and potential damage to the existing systems. The embodiment illustrated in FIG. 1 is designed to create a pump system 50 that satisfies the pressure head requirements for effective use of in-floor systems, chlorinators, and other water feature systems in combination with a multi-speed pump. In various embodiments, the pump system 50 may comprise a pool pump 56, a heater 52, and a plurality of pipes 58, 62, 64, 66 going to a plurality of pool devices. In the embodiment of FIG. 1, the pool pump 56 comprises a multi-speed pool pump that is configured to pump water out at different pressures. The pipes on the opposite end of the pool pump 56 continue to operate pool devices that work most effective with particular levels of water pressure for which they were designed. For example, an in-floor cleaning system (such as one in fluid communication with pipe 58) works most effectively with a high-pressure head, while a chlorinator (such as one in fluid communication with pipe 62) works most effectively with a constant pressure head. Other implementations may include a system that allows a high-pressure head to be directed to any combination of pressure side cleaners, pop up in-floor nozzles, wall nozzles, pressure side robotic cleaners. In the same or other implementations, a low pressure head may be directed to any combination of other auxiliary equipment, such as but not limited to chlorinators in fluid communication with pipe 62, water features in fluid communication with pipe 64, and the like. In application of particular embodiments of a bypass valve 5, devices designed for operation with either a low-pressure head or a high-pressure head may work well and without damage in combination with a multi-speed pump 56. Embodiments of pump system 50 may further comprise a return pipe 66.

Various embodiments of a bypass valve assembly, shown and described in greater detail below, assist in diverting the proper pressure head of water from the multi-speed pool pump 56 to the specifically designed device. For example, if a pool pump is creating a low-pressure head, the bypass valve 5 allows low-pressure water flow to the low-pressure devices through a low-pressure port 30. If, however, the pool pump 56 is creating a high-pressure head, the bypass valve 5 blocks the passage of water through the pipes to the low-pressure devices and diverts the water through the high pressure port 40. Embodiments of the bypass valve disclosed herein allow for automated pressure regulation that diverts water from the pool pump 56 to different device dependent upon the detected high- or low-pressure head produced by the pool pump 56.

Figure 2:
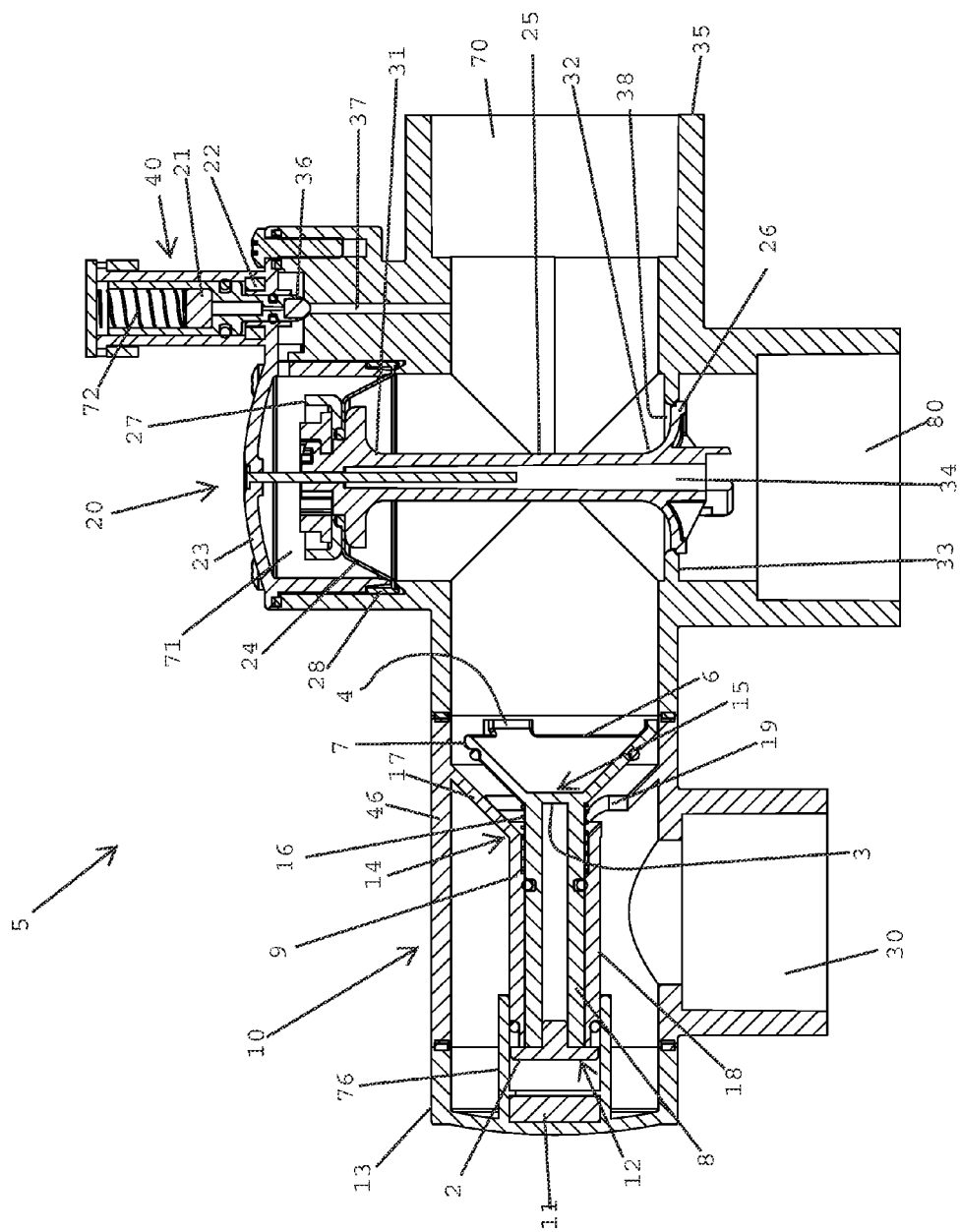
FIG. 2 is a cross-sectioned view of a bypass valve taken at cross-section line A-A of FIG. 1 illustrating the internals of a first bypass valve embodiment.

As shown in FIG. 2, a particular embodiment of an automated pressure regulated water diversion system comprises a low-pressure valve assembly 10, a high-pressure valve assembly 20, and an actuator 40 associated with the high-pressure valve assembly 20. The low-pressure valve assembly 10 is be configured to allow water to flow through one or more pipes to devices specifically designed for a low-pressure head when a pump 56 is pumping water at low-pressure, but prevent water from flowing through the one or more pipes when the pump 56 is pumping water at a high-pressure. In a particular embodiment, the low-pressure valve assembly 10 may comprise a bypass housing 46, a bypass cover 13, a bypass magnet 11, a bypass attractor 12, a bypass valve receiver 14, a low-pressure valve 15, and a bypass spring 16.

In various embodiments, the bypass valve receiver 14 fits within the bypass housing 46 and comprise a conical valve seat 17 coupled to a sleeve 18. In some embodiments, the valve seat 17 is coupled to the sleeve 18 at a narrower end of the conical valve seat 17. In other embodiments, the valve seat 17 may comprise any shape. In most embodiments, the valve seat 17 comprises a low-pressure canal opening 19 that allows water to flow through the valve seat 17 to the low-pressure port 30. The low-pressure canal opening 19 on the valve seat 17 may comprise any size that allows for a low-pressure head of water to flow through the low-pressure valve assembly. The low-pressure canal opening 19 may be located anywhere on either the sleeve 18 or the valve seat 17, or the juncture between the cylindrical end and the valve seat 17. The sleeve 18 of the bypass valve receiver 14 may further comprise a lip 9. In various embodiments, the lip 9 may narrow an opening in the sleeve 18 that travels at least partially through the sleeve 18. For example, the interior portion of the sleeve 18 distal to the valve seat 17 may be narrower than the interior portion of the sleeve 18 that connects to the valve seat 17.

An embodiment of the low-pressure valve 15 further comprises a low-pressure seal 7 and a plunger shaft 8. The low-pressure seal 7 may comprise a substantially conical shaped plunger sized to fit within the conical valve seat 17 of the bypass receiver 14. When the low-pressure seal 7 abuts the valve seat 17, a seal is formed over the low-pressure canal opening 19 in the valve seat 17 such that very little or no water passes through the low-pressure canal opening 19 in the valve seat 17. The low-pressure seal 7 may comprise of a variety of materials, such as, but not limited to plastics, rubbers, metals, and the like. In some embodiments, the low-pressure seal 7 may comprise a capped end 6. The capped end 6 may be positioned on the wider opening of the conical low-pressure seal 7. The capped end 6 of the low-pressure seal 7 further comprises a hole 4 or opening that allows water to enter the conical low-pressure seal 7.

The low-pressure valve 15 typically further comprises a plunger shaft 8 that extends from the narrow end of the conical low-pressure seal 7. In particular implementations, a wall 3 separates the narrow end of the conical low-pressure seal 7 from the cylindrical end of the low-pressure valve 15. The plunger shaft 8 of the low-pressure valve 15 may be configured to fit within the sleeve 18 of the valve receiver 14. In an embodiment comprising the lip 9 on the valve receiver 14, a portion of the outside of the plunger shaft 8 substantially abuts or contacts the narrower portion of the inside of the cylindrical end of the valve receiver 14. In the portion of the valve receiver 14 between the lip 9 and the valve seat 17, a small space exists between the exterior or outside of the plunger shaft 8 of the low-pressure valve 15 and the interior or inside portion sleeve 18 of the valve receiver 14.

In some embodiments, a low-pressure valve assembly 10 further comprises a spring 16 that fits in the small space between the respective sleeve 18 of the valve receiver 14 and the plunger shaft 8 of the low-pressure valve 15. In other embodiments, the spring 16 is placed elsewhere. The spring 16 encircles at least a portion plunger shaft 8 of the low-pressure valve 15 in FIG. 2. When the plunger shaft 8 of the low-pressure valve 15 is inserted into the sleeve 18 of the valve receiver 14, the lip 9 of the valve receiver 14 engages an end of the spring 16 distal to the low-pressure seal 7 and prevents the spring 16 from traveling or extending any further into the sleeve 18 of the bypass valve receiver 14. The spring 16, then, prevents the low-pressure seal 7 from contacting the valve seat 17 and thus plugging or sealing the low-pressure canal opening 19 in the valve seat 17 when no or low-pressure is applied to the low-pressure seal 7. For example, when a low-pressure head of water is flowing through the system, the low-pressure exerted on the low-pressure seal 7 is not strong enough to collapse the spring 16. Accordingly, water is able to flow past the low-pressure seal 7, through the low-pressure canal opening 19 in the valve seat 17, and on to low-pressure water devices through low-pressure port 30.

Under high-pressure head conditions, however, the water pressure is strong enough to collapse the spring 16 as the lip 9 prevents the spring 16 from extending further into the opening of the valve sleeve 18 of the valve receiver 14. When the spring 16 is collapsed, the low-pressure seal 7 is pressed against the valve seat 17 such that no water flows through the low-pressure canal opening 19 in the valve seat 17. This prevents low-pressure devices in communication with the low-pressure port 30 from receiving high-pressure water, and directs all high-pressure water to the high-pressure devices associated with the high-pressure port 80 (as shall be described in greater detail below).

In various embodiments, a bypass attractor 12 is coupled to the opening of the plunger shaft 8 of the low-pressure valve 15 distal to the low-pressure seal 7. The bypass attractor 12 may cap any opening in the plunger shaft 8. The bypass attractor 12 may also comprise a stop element 2 that contacts the end of the valve receiver sleeve 18 distal to the valve seat 17 and prevents the low-pressure valve 15 from leaving the valve receiver 14. A bypass magnet 11 may also be coupled or molded to the bypass cover 13. The attraction between the bypass magnet 11 and the bypass attractor 12 assists in stabilization of the low-pressure valve assembly 10 when water pressure has minor fluctuations. For example, after a high-pressure head has compressed the spring 16 and sealed the low-pressure canal opening 19 in the valve seat 17, a temporary drop in the water pressure may likewise temporarily unseal the low-pressure canal opening 19 in the valve seat 17 as the spring 16 decompresses and extends the low-pressure seal 7 away from the valve seat 17. If, however, the bypass attractor 12 is in contact with the bypass magnet 11, the attraction between the two elements prevents the low-pressure seal 7 from unsealing the low-pressure canal opening 19 in the bypass valve seat 17 until there is a significant drop in water pressure, such as the drop from a high-pressure head to a low-pressure head.

The bypass housing 46 may comprise any variety of shapes, materials, or alignments configured to house the low-pressure valve assembly 10. The bypass cover 13 is typically configured couple to an end of the bypass housing 46. As previously described, the bypass cover 13 may comprise a magnet 11 coupled or molded in an interior wall of the bypass cover 13. In some embodiments, the bypass cover 13 further comprises valve guides 76 that extend into the bypass housing 46. The valve guides 76 extend from an area near the bypass magnet 11 and may be configured to fit either or both cylindrical ends of the valve receiver 14 and the low-pressure valve 15. In an embodiment, the bypass magnet is adjustable to change the set point of closing the low-pressure canal opening 19.

As depicted in FIG. 2, the bypass valve assembly 5 of the water diversion system may comprise a high-pressure valve assembly 20. The high-pressure valve assembly 20 is configured to allow water to flow through from the inlet port 70 to the high-pressure port 80 and subsequently to devices specifically designed for a high-pressure head when a pump 56 is pumping water at high pressure. The high-pressure valve assembly 20 also prevents substantially all water entering the inlet port 70 from flowing into the high-pressure port 80 when the pump 56 is pumping water at a low pressure. The high-pressure valve assembly 20 typically comprises a stem 25, a diaphragm 24, a seal 26, a fastener 27, and a high-pressure cover 23.

In particular embodiments, a fastener 27 couples the diaphragm 24 to the stem 25. The fastener 27 may couple the diaphragm 24 to the stem through a variety of mechanisms, such as but not limited to adhesives, bayonets, or a threaded-screw mechanism. Once applied, an embodiment of the fastener 27 holds the diaphragm 24 in place between the fastener 27 and arms extending from the stem 25.

The diaphragm 24 may be comprised of a variety of materials, such as but not limited to a flexible rubber. In some implementations, the diaphragm 24 is circular in shape and extends from the stem 25 to walls of the main housing 35, although in other implementations, the diaphragm 24 may comprise any shape. The diaphragm 24 is typically biased up when under little or no pressure and may be held to the wall of the main housing 35 via pressure applied by the high-pressure cover 23. In various implementations, the diaphragm 24 comprises a ridge 28 that fits into a groove formed into the main housing 35. The high-pressure cover 23 may then apply pressure to pinch or push the ridge of the diaphragm into the groove. In other implementations, the diaphragm 24 is tightly secured between the main housing 35 and the high-pressure cover 23. In still other implementations, the diaphragm 24 is coupled to the main housing 35 in any variety of manners, such as but not limited to adhesives, melting, threaded screws, and the like.

In a particular embodiment, a stem 25 continues from a diaphragm end 31 coupled to the diaphragm 24 to a sealing end 32 opposite the diaphragm end 24. The sealing end 32 of the high-pressure valve assembly 20 comprises a seal 26 that seals a canal 38 between the high-pressure port 80 and the inlet port 70 when in a closed position. The seal 26 typically resides or rests in a closed position when the high-pressure valve assembly 20 is under no pressure or low pressure. In a closed position, the seal 26 is pulled tight against a lip 33 from underneath the lip 33. This accomplished when the diaphragm 24 is raised, thus lifting diaphragm end 31 and the seal 26 into a closed position. When pressure is applied to the fastener 27 and/or diaphragm 24 from above the diaphragm 24 in the valve chamber 71, the diaphragm 24 collapses or moves to a lowered position, thus lowering the seal 26. When the seal 26 is lowered below the lip 33, water is able to flow through the previously sealed canal 38 into the high-pressure port 80 and continue to high-pressure devices. When pressure above the diaphragm 24 in the valve chamber 71 and the fastener 27 is lowered significantly or removed, the diaphragm 24 reverts to its previous closed position, lifting the seal 26 back into a closed position. To allow water to be exhausted from the valve chamber 71 after the diaphragm 24 returns to its raised position, the stem 25 may further comprise a hole 34 that exhausts the excess water into the high-pressure port 80 below the seal 26. In other embodiments, the high-pressure valve assembly 20 may comprise a spring instead of a diaphragm 24. The spring may function similar to the diaphragm, in that when a high pressure is applied above the spring, the spring collapses, thus lowering the seal 26 into an open position. When low or no pressure is applied, the spring reverts to a raised state, thus lifting the seal 26 into a closed position.

In some embodiments, regulation of water pressure above the diaphragm 24 is carried out through an actuator 40 associated with the high-pressure valve assembly 20. The actuator 40 is typically comprised of a magnet 21, an attractor 22, and a plug 36. In an embodiment, a channel 37 or series of channels connect the main housing 35 and inlet port 70 to the valve chamber 71 in the high-pressure valve assembly 20 above the diaphragm 24. When under no pressure or low-pressure conditions, the plug 36 resides in a closed position and plugs the channel 37, thus preventing water from applying pressure to the diaphragm 24 in the valve chamber 71. The plug 36 may be held in the closed position with the assistance from the attractor 22 and the magnet 21. For example, the plug 36 may be coupled to the magnet 21 such that the attractor 22 pulls the magnet 21 down and holds the plug 36 in a closed position under no or low-pressure conditions. Furthermore, the magnet 21 and the attractor 22 may be adjusted in relation to the other to change the setting at which the plug 36 is released or actuated. Such adjustment of the magnet 21 and attractor 22 allows a user to control the pressure level wherein the water flows to the high-pressure port 80 and on to the high-pressure line. Other implementations may further comprise a spring 72 that pushes the magnet 21 and or the plug 36 down into a closed position under no low-pressure conditions.

When a high-pressure head is applied to the high-pressure valve assembly 20, the increased water pressure is strong enough to overcome the attraction between the magnet 21 and the attractor 22, thus lifting the plug 36 and allowing water to travel through the channel 37 to the valve chamber 71. The high-pressure water then applies pressure to the fastener 27 and the diaphragm 24, thus lowering the diaphragm 24 to a lowered position and consequently lowering the seal 26 to allow water to flow through the canal 38 from the inlet port 70 to the high-pressure port 80 and on to the high-pressure devices. When the water level is returned to a lower-pressure state, the plug 36 is once again lowered and plugs the channel 37. As the plug 36 blocks water from applying pressure to the diaphragm 24 in the valve chamber 71, the diaphragm 24 then returns to a raised position, which in turn raises the seal 26 to seal the high-pressure port 80 from water flow.

Working in conjunction, the low-pressure valve assembly 10 and the high-pressure valve assembly 20 automatically regulate water flow to low-pressure devices and high-pressure devices. For example, in low-pressure conditions, the plug 36 of the actuator 40 prevents water from applying pressure in the valve chamber 71 above the diaphragm 24. As a result, the high-pressure port 80 that leads to the high-pressure devices remains substantially sealed from water with the seal 26 of the stem 25. Simultaneously, the springs 16 of the low-pressure valve assembly 10 prevent the low-pressure seal 7 from sealing the low-pressure canal opening 19 on the valve seat 17 because the low-pressure head of water is not strong enough to overcome the force exerted by the spring 16 pushing the low-pressure seal 7 away from the valve seat 17. As such, a low-pressure head of water is allowed to flow through the low-pressure canal opening 19 of the valve seat 17 and into the low-pressure port 30 that leads to low-pressure devices. The user may further control the water pressure level wherein the seal 26 of the high-pressure valve assembly 20 is opened by adjusting the magnet 21 and attractor 22.

When a high-pressure head of water is applied to the overall system, multiple changes occur in the system substantially simultaneously. The high-pressure head of water is strong enough to overcome the force exerted by the spring 16 on the low-pressure seal 7. The force of the high-pressure head of water on the conical low-pressure seal 7 then pushes the low-pressure seal 7 against valve seat 17, thus sealing the low-pressure canal opening 19 in the valve seat 17 and preventing a high-pressure head of water from flowing to the low-pressure port 30. Substantially simultaneously, the high-pressure head of water lifts the plug 36 of the actuator 40, allowing more pressure to be exerted in the valve chamber 71 above the diaphragm 24. The pressure exerted on the diaphragm 24 then lowers the seal 26 of the stem 25 and allows a high-pressure head of water to flow to the high-pressure pressure port 80 and on to the high-pressure devices.

Figure 3:
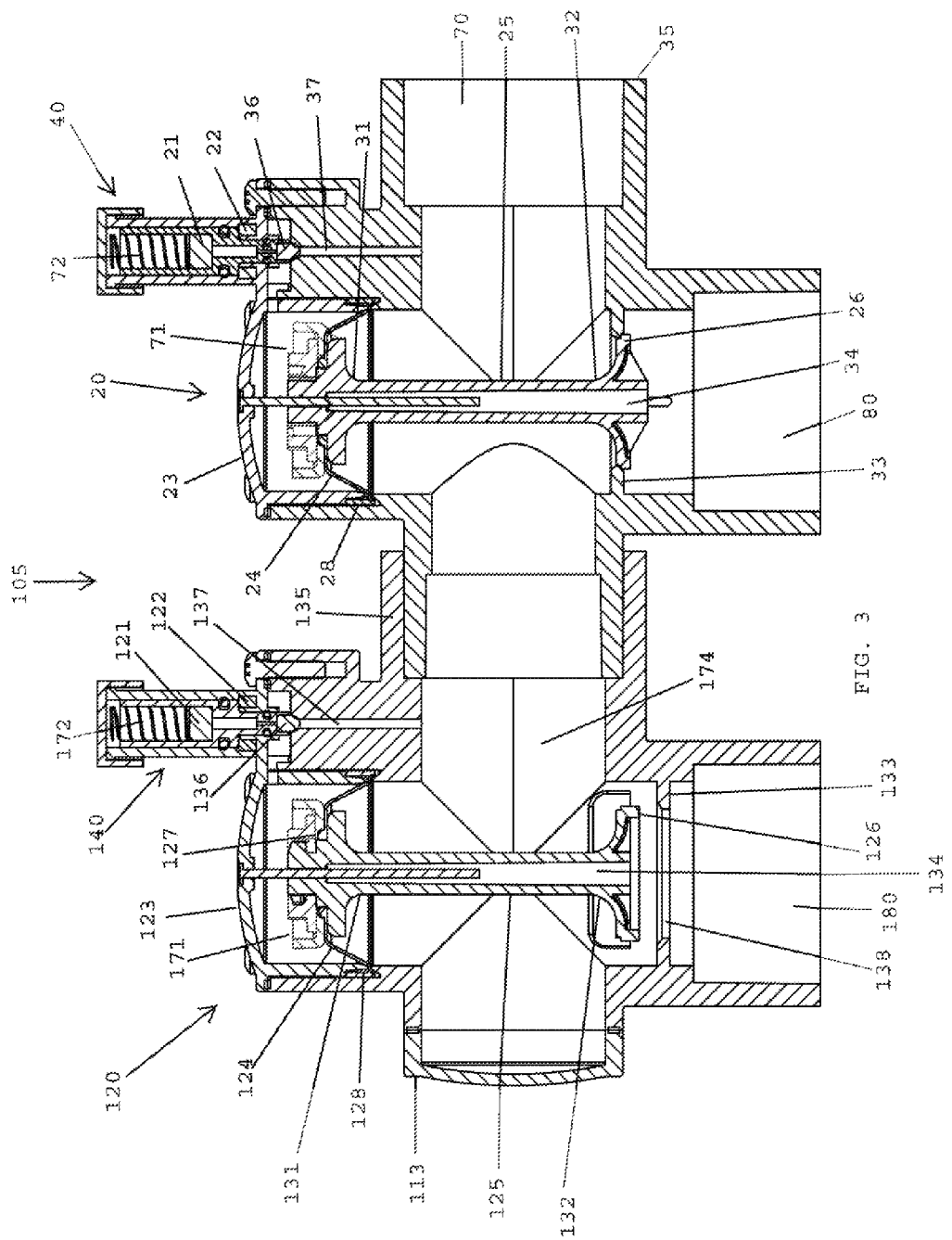
FIG. 3 is a cross-sectioned view of a bypass valve taken at cross-section line A-A of FIG. 1 illustrating the internals of a second bypass valve embodiment.

Various implementations comprise variations on a high-pressure valve assembly and a low-pressure valve assembly. For example, in some implementations, both the high-pressure valve assembly and the low-pressure valve assembly utilize a spring on each assembly rather than a diaphragm on either port. In other implementations, the low-pressure valve may utilize a diaphragm, while the high-pressure port may utilize a spring. In still other implementations, as shown in FIG. 3, both the high-pressure valve assembly 20 and the low-pressure valve assembly may utilize a diaphragm 24, 124. In such an implementation, the high-pressure valve assembly comprises elements and aspects similar to those previously described in relation to FIG. 2.

The low-pressure valve assembly 120 of bypass valve 105, however, utilizes a diaphragm 124 and actuator 40 combination rather than a low-pressure valve 15 and bypass receiver 14. Assembly of the low-pressure valve assembly 120 comprising a diaphragm 124 may be similar to the high-pressure valve assembly 20 comprising a diaphragm 24, with several exceptions. First, the seal 126 of the low-pressure valve assembly remains in an open position that does not seal low-pressure canal opening 138 in no-pressure or low-pressure conditions. In FIG. 3, the lip 133 of the low-pressure valve assembly 120 that mates with the low-pressure seal 126 in a closed position is lower than the lip 33 of the high-pressure valve assembly 20 that mates with the high-pressure seal 26 in a closed position. Accordingly, while the high-pressure canal opening 38 is closed, the low-pressure canal opening 138 leading to the low-pressure port 180 is open. In other embodiments, the lips 33, 133 of the high-pressure valve assembly 20 and the low-pressure valve assembly 120 may be substantially similar, but the stem 125 of the low-pressure valve assembly 120 may be shorter than the stem 25 of the high-pressure valve assembly.

When pressure is applied above the diaphragm 124 in the valve chamber 171 of the low-pressure valve assembly 120, the seal 126 of the low-pressure valve assembly 120 lowers to a closed position to seal the low-pressure canal 138. This substantially prevents fluid communication between the low-pressure port 180 and the inlet port 70. Thus, the seal 126 of the low-pressure valve assembly 120 resides primarily above the lips 133 of the low-pressure valve assembly 120 in a open position and even typically a closed position. In contrast, the seal of the high-pressure valve assembly 20 is raised from below the lips 33 of the high-pressure valve assembly 120 to a closed position. Therefore, the seal 26 of the high-pressure valve assembly 20 is primarily below the lips 33 of the high-pressure valve assembly 20 in a closed position.

In conjunction, the high-pressure valve assembly 20 and low-pressure valve assembly 120 of FIG. 3 work as follows in an exemplary embodiment: when the pump 56 is pumping water to the bypass valve 105 with a low-pressure head, the plugs 36, 136 of both the high-pressure actuator 40 and the low-pressure actuator 140 plug the respective channels 37, 137 that lead to the low-pressure diaphragm 124 and the high-pressure diaphragm 24. Because both diaphragms 24, 124 remain biased upward, the high-pressure valve assembly seal 26 closes the entry to the high-pressure valve assembly 20, while the low-pressure seal 126 is raised above the entry to the low-pressure line, allowing a low-pressure head of water to flow to the low pressure devices.

When the pump 56 creates a high-pressure head, the high-pressure head forces both plugs 36, 136 of the high-pressure actuator 40 and the low-pressure actuator 140 up, allowing water to flow to the valve chambers 71 and 171 above each diaphragm. Under such a high-pressure head, each of the diaphragms 24, 124 collapse or are lowered. When the low-pressure valve assembly diaphragm 124 is lowered, the low-pressure valve assembly is lowered to a closed position, thus blocking water from entering the low pressure line. When the stem 25 of high-pressure valve assembly 20 is lowered, the high-pressure seal 26 is lowered to an open position, thus allowing water to flow to the high-pressure devices through high-pressure port 80.

In other implementations, the bypass system may comprise a single diaphragm coupled to two stems and two seals. In such an implementation, when the diaphragm is lowered, one seal may open and one seal may close. In still other implementations, the bypass system may be configured to utilize a single plug. In systems utilizing a single plug, the channel blocked by the plug may split into two channels behind the plug, such that when the plug is raised, water is diverted to both diaphragms.

When the water pump 56 is turned off or returns to creating a low-pressure head, each of the plugs 136, 36 of the low-pressure actuator and the high-pressure actuator is lowered, thus plugging the channels 37, 137 that lead to the valve chambers 71, 171 above each of the diaphragms 24, 124. Channel 137 typically leads from a bypass port 174 to the valve chamber 171. When a high-pressure is no longer applied above each of the diaphragms 24, 124, the diaphragms 24, 124 revert to a raised position. When the low-pressure diaphragm 124 is raised, the low-pressure seal 126 is raised, once again allowing water to flow through the low-pressure canal opening 138 to the low-pressure line. When the high-pressure diaphragm 24 is raised, the high-pressure seal 26 is raised to close the high-pressure canal opening 38.

As previously noted, the low-pressure valve assembly 120 of the bypass valve 105 comprises various parts and elements similar to the high-pressure valve assembly 20. For example, embodiments of the low-pressure valve assembly 120 comprise an actuator 140 similar to actuator 40, including magnet 121, attractor 122, plug 136, spring 172. Embodiments of the low-pressure valve assembly 120 further comprise a fastener 127, a low-pressure cover 123, a valve chamber 171, a diaphragm 124, and a ridge 128 similar to corresponding parts of the high-pressure valve assembly 20 previously described. Embodiments of the low-pressure valve assembly 120 further comprise a stem 125 with a diaphragm end 131 and a seal end 132 opposite the diaphragm end 131. A low-pressure canal opening 138 bordered by lip 133 typically connects or is positioned between the low-pressure port 180 and the rest of the interior of a bypass housing 135 in embodiments of the low-pressure valve assembly 120. The bypass housing 135 is typically coupled to the main housing 35 of the high-pressure valve assembly 20, and may comprise a low-pressure cover 113 similar to the low-pressure cover 13 of low-pressure valve assembly 10.

Figure 4:
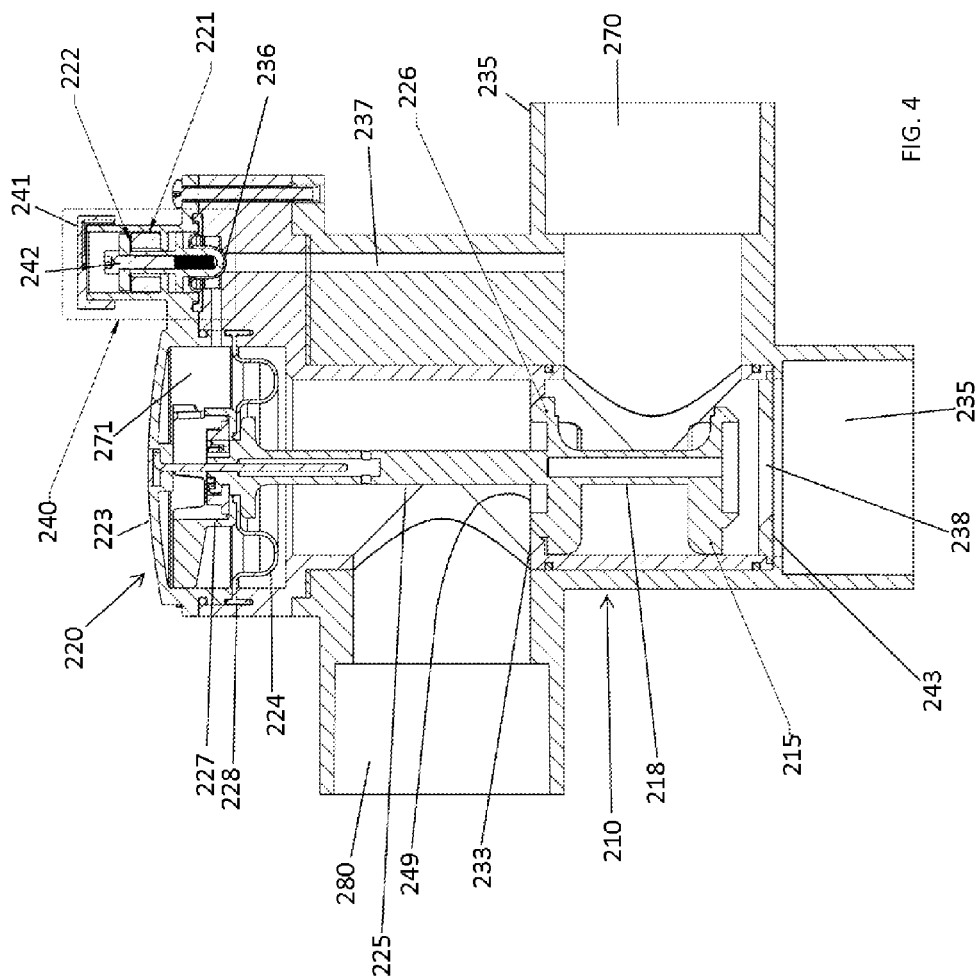
FIG. 4 is a cross-sectioned view of a bypass valve taken at cross-section line A-A of FIG. 1 illustrating the internals of a third bypass valve embodiment.

FIG. 4 illustrates another embodiment of a bypass valve 205. In contrast to bypass valves 5 and 105, in which the low-pressure valve assemblies 10, 120 and the high-pressure valve assemblies 20 are comprise separate assemblies, another embodiment of the bypass valve comprises a low-pressure valve assembly 210 and a high-pressure valve assembly 220 coupled together.

In particular embodiments, bypass valve 205 comprises a main housing 235, an inlet port 270, a low pressure port 235, a high-pressure port 280, an actuator 240, a low-pressure valve assembly 210, and a high pressure valve assembly 220. In the absence of high-pressure valve assembly 220 and low-pressure valve assembly 210, inlet port 270 is in fluid communication with high-pressure port 280 through high-pressure canal opening 249 and with low-pressure port 235 through low-pressure canal opening 238.

Like other embodiments of bypass valves 5, 105 presented herein a channel 237 extends between the inlet port 270 and the valve chamber 271. The channel 237 allows fluid communication between the valve chamber 271 and the inlet port unless the plug 236 of the actuator 240 is plugging the channel. Like actuators 40, 140 described in relation to previous bypass valve embodiments 5, 105, the actuator 240 of bypass valve 205 comprises a magnet 221 and an attractor 222. In actuator 240, the magnet 222 is pressed in to actuator 240. Spacing between the attractor 222 and the magnet 221 is adjustable, typically through rotation of the bolt 242. The plug 236 of actuator 240 may, in some embodiments, comprise a diaphragm-lined plug that surrounds the base of the bolt 242. Actuator 240 may further comprise a removable actuator cover 241 that allows for easy access to adjust the attractor 222 spacing.

Similar to high-pressure valve assembly 20, high-pressure valve assembly 220 comprises a diaphragm 224 coupled to a stem 225. A fastener 227 typically couples the diaphragm 224 to the stem 225, and ridges 228 on the diaphragm 224 are typically utilized to couple the diaphragm 224 to the sides of the main housing 235. A valve chamber 271 is also formed between the diaphragm 224 and the high-pressure cover 223. Although the diaphragm 224 is shown in FIG. 4 with a channel or ring, the diaphragm 224 typically functions similar to that of diaphragms 24, 124 previously described herein. That is, pressure in the valve chamber 271 causes movement of portions of the diaphragm 224 that ultimately expand the volume of the valve chamber 271. This movement of portions of the diaphragm ultimately moves the stem 225 to effectuate movement of the seals 226, 215. Pressure in the valve chamber 271 is typically a result of a high-pressure head of water in the bypass valve 205 that unplugs the channel 237 extending between the valve chamber and inlet port 270.

High-pressure valve assembly 220 further comprises a high-pressure seal 226 coupled to the stem 225 opposite the diaphragm 224. As previously described herein, movement of the high-pressure seal 226 is responsive to movement of the diaphragm 224 effectuated by changes in pressure in the valve chamber 271. Low-pressure valve assembly 210 comprises a low-pressure stem 215 coupled to the high-pressure seal 226 and a low-pressure seal 215 coupled to the stem opposite the high-pressure seal 226. High-pressure seal 226 and low-pressure seal 218 may each comprise angled edges that configured to abut respective angled lips 233 and 243 that border the high-pressure canal opening 249 and the low pressure canal opening 238.

In operation, bypass valve 205 operates to allow fluid communication between the inlet port 270 and the low-pressure port 235 under low-pressure head conditions while simultaneously substantially preventing fluid communication between the inlet port 270 and the high-pressure port 280. In high-pressure head conditions, the bypass valve 205 operates to allow fluid communication between the inlet port 270 and the high-pressure port 280, while simultaneously substantially preventing fluid communication between the inlet port 270 and the low-pressure port 235.

In an embodiment of the bypass valve 205, the high-pressure canal opening 249 and the low-pressure canal opening 238 are substantially aligned opposite one another. Similarly, the low-pressure seal 215 and the high-pressure seal 226 are aligned on opposite ends of the low-pressure stem 218. Embodiments with misaligned the canal openings 249, 238 are also contemplated. In such embodiments, the high-pressure seal 226 and the low-pressure seal 215 are also misaligned to enable sealing of the respective canal openings 249, 238

FIG. 4 illustrates the bypass valve under low-pressure head conditions. As shown, positioning of the diaphragm 224 under low-pressure head conditions causes the high-pressure seal 226 to seal the high-pressure canal opening 249 while preventing the low-pressure seal 215 from sealing the low-pressure canal opening 238. Because the low-pressure canal opening 238 is not sealed by the low-pressure seal 215, fluid communication is allowed between the inlet port 270 and the low-pressure port 235. This allows a low-pressure head of water to be sent from the multi-speed pump 56 to devices best suited for a low-pressure head of water. Because the high-pressure canal opening 249 is sealed by the high-pressure seal 226, fluid communication between the inlet port 270 and the high-pressure port 280 is prevent. This prevents a low-pressure head of water from being sent from the multi-speed pump to devices best suited for a high-pressure head of water.

A high-pressure head of water from multi-speed pump 56 results in sealing of the low-pressure canal opening 238 and opening of the high-pressure canal opening 249. A high-pressure head exerts a force on the plug 236 of the actuator 240, thus allowing fluid communication between the valve chamber 271 and the inlet port 270. As pressure in the valve chamber 271 increase, the valve chamber 271 expands when diaphragm 224 moves from a low-pressure positioning to a high-pressure positioning. Movement of the diaphragm 224 lowers the stem 225, thus lowering both the high-pressure seal 226 and the low-pressure seal 215. Lowering of the high-pressure seal 226 moves the high-pressure seal 226 from a closed position sealing the high-pressure canal opening 249 to an open position unsealing the high-pressure canal opening. Lowering of the low-pressure seal 215 moves the low-pressure seal 215 from an open position to a closed position sealing the low-pressure canal opening 238.

It will be understood that implementations are not limited to the specific components disclosed herein, as virtually any components consistent with the intended operation of a method and/or system implementation may be utilized. In places where the description above refers to particular implementations or embodiments, it should be readily apparent that a number of modifications may be made without departing from the spirit thereof. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A bypass valve assembly for use with a multi-speed pool pump, comprising: a housing comprising an inlet port, a high-pressure (HP) port with a HP canal opening between the HP port and the inlet port, and a low-pressure (LP) port with a LP canal opening between the LP port and inlet port; a HP valve assembly within the housing, the HP valve assembly comprising: a HP seal movable between a HP sealed position that seals the HP canal opening and a HP open position that unseals the HP canal opening; a HP stem coupled to the HP seal; a HP diaphragm coupled to the HP stem opposite the HP seal; and a HP valve chamber adjacent the HP diaphragm, the HP diaphragm moving the HP seal from the HP sealed position to the HP open position responsive to pressure in the HP valve chamber; a LP valve assembly comprising a LP seal movable between a LP sealed position and a LP open position, the LP sealed position sealing the LP canal opening with the LP seal responsive to a HP head; a HP channel extending from the inlet port to the HP valve chamber; a HP actuator comprising a HP plug positioned on the housing to plug the HP channel responsive to a LP head and movable to allow fluid communication between the valve chamber and the inlet port responsive to the HP head.

2. The bypass valve assembly of claim 1, wherein the HP actuator further comprises a HP attractor, a HP magnet, and a HP spring positioned to hold the plug in the HP channel responsive to the LP head.

3. The bypass valve assembly of claim 2, wherein the LP valve assembly comprises: a bypass receiver comprising a valve sleeve and valve seat coupled to the valve sleeve, the valve sleeve comprising an inner lip and the LP canal opening being positioned on the valve seat; a LP valve comprising the LP seal and a plunger shaft coupled to the LP seal and slidable within the valve sleeve, the LP seal shaped to abut the valve seat in the LP sealed position; a spring surrounding a portion of the plunger shaft and positioned between the inner lip and the plunger, the spring configured to bias the plunger away from the valve seat, wherein the spring biases the LP seal to the open position responsive to the LP head and the LP seal partially collapses the spring to seal the LP canal opening responsive to the HP head.

4. The bypass valve assembly of claim 3, wherein the LP valve assembly is coupled to a LP cover and further comprises two valve guides coupled to the LP cover, a bypass magnet coupled to the LP cover between the two valve guides, and a bypass attractor coupled to the plunger shaft opposite the LP seal.

5. The bypass valve assembly of claim 4, wherein the bypass magnet and bypass attractor are adjustable.

6. The bypass valve assembly of claim 2, wherein the LP valve assembly further comprises: a bypass port in fluid communication with the inlet port; a LP stem coupled to the LP seal; a LP diaphragm coupled to the LP stem opposite the LP seal; and a LP valve chamber adjacent the LP diaphragm, the LP diaphragm moving the LP seal from the LP sealed position to the LP open position responsive to pressure in the LP valve chamber; a LP channel extending from the bypass port to the LP valve chamber; and a LP actuator comprising a LP plug positioned on the housing to plug the LP channel responsive to the LP head and movable to allow fluid communication between the LP valve chamber and the bypass port responsive to the HP head.

7. The bypass valve assembly of claim 6, wherein the LP actuator further comprises an LP attractor, a LP magnet, and a LP spring positioned to hold the LP plug in the LP channel responsive to the LP head.

8. The bypass valve assembly of claim 1, wherein the LP valve assembly further comprises a LP stem coupled to the LP seal and the HP seal on opposing ends of the LP stem.

9. A multi-speed pool pump system, comprising: a multi-speed pool pump configured to pump water at a high-pressure (HP) head and a (LP) head; a bypass valve assembly comprising: a housing comprising an inlet port in fluid communication with the multi-speed pool pump, a HP port with a HP canal opening between the HP port and the inlet port, and a LP port with a LP canal opening between the LP port and the inlet port; a HP valve assembly within the housing, the HP valve assembly comprising a HP seal movable between a HP sealed position that seals the HP canal opening and a HP open position the unseals the HP canal opening, a HP stem coupled to the HP seal, a HP diaphragm coupled to the HP stem opposite the HP seal, and a HP valve chamber adjacent the HP diaphragm, the HP diaphragm moving the HP seal from the HP sealed position to the HP open position responsive to pressure in the HP valve chamber; a LP valve assembly comprising a LP seal movable between a LP sealed position and a LP open position, the LP sealed position sealing the LP canal opening with the LP seal responsive to the HP head; a HP channel extending from the inlet port to the HP valve chamber; and a HP actuator comprising a HP plug positioned on the housing to plug the HP channel responsive to the LP head and movable to allow fluid communication between the HP valve chamber and the inlet port responsive to the HP head; one or more LP devices in fluid communication with the LP port; and one or more HP devices in fluid communication with the HP port.

10. The multi-speed pool pump system of claim 9, wherein the HP actuator further comprises a HP attractor, a HP magnet, and a HP spring positioned to hold the plug in the HP channel responsive to the LP head.

11. The multi-speed pool pump system of claim 10, wherein the LP valve assembly comprises: a bypass receiver comprising a valve sleeve and valve seat coupled to the valve sleeve, the valve sleeve comprising an inner lip and the LP canal opening being positioned on the valve seat; a LP valve comprising the LP seal and a plunger shaft coupled to the LP seal and slidable within the valve sleeve, the LP seal shaped to abut the valve seat in the LP sealed position; a spring surrounding a portion of the plunger shaft and positioned between the inner lip and the plunger, the spring configured to bias the plunger away from the valve seat, wherein the spring biases the LP seal to the open position responsive to the LP head and the LP seal partially collapses the spring to seal the LP canal opening responsive to the HP head.

12. The multi-speed pool pump system of claim 11, wherein the LP valve assembly is coupled to a LP cover and further comprises two valve guides coupled to the LP cover, a LP magnet coupled to the LP cover between the two valve guides, and a bypass attractor coupled to the plunger shaft opposite the LP seal.

13. The bypass valve assembly of claim 10, wherein the LP valve assembly further comprises: a bypass port in fluid communication with the inlet port; a LP stem coupled to the LP seal; a LP diaphragm coupled to the LP stem opposite the LP seal; and a LP valve chamber adjacent the LP diaphragm, the LP diaphragm moving the LP seal from the LP sealed position to the LP open position responsive to pressure in the LP valve chamber; a LP channel extending from the bypass port to the LP valve chamber; and a LP actuator comprising a LP plug positioned on the housing to plug the LP channel responsive to the LP head and movable to allow fluid communication between the LP valve chamber and the bypass port responsive to the HP head.

14. The bypass valve assembly of claim 13, wherein the LP actuator further comprises an LP attractor, a LP magnet, and a LP spring positioned to hold the LP plug in the LP channel responsive to the LP head.

15. The bypass valve assembly of claim 9, wherein the LP valve assembly further comprises a LP stem coupled to the LP seal and the HP seal on opposing ends of the LP stem.

16. A bypass valve assembly for use with a multi-speed pool pump, comprising: a housing comprising an inlet port, a high-pressure (HP) port with a HP canal opening between the inlet port and the HP port, and a low-pressure (LP) port with a LP canal opening between the inlet port and the LP port; a HP valve assembly within the housing, the HP valve assembly comprising a HP seal; a HP stem coupled to the HP seal; a HP diaphragm coupled to the HP stem opposite the HP seal; and a HP valve chamber adjacent the HP diaphragm, the HP diaphragm moving the HP seal from the HP sealed position to the HP open position responsive to pressure in the HP valve chamber; a HP channel extending from the inlet port to the HP valve chamber; a HP actuator comprising a plug positioned on the housing to plug the HP channel responsive to the LP head and movable to allow fluid communication between the valve chamber and the inlet port responsive to the HP head; a LP valve assembly comprising a LP seal movable between a LP sealed position that seals the LP canal opening responsive to a HP head and a LP open position responsive to a LP head.

17. The bypass valve assembly of claim 16, wherein the LP valve assembly further comprises: a bypass receiver comprising a valve sleeve and valve seat coupled to the valve sleeve, the valve sleeve comprising an inner lip and the LP canal opening being positioned on the valve seat; a LP valve comprising the LP seal and a plunger shaft coupled to the LP seal and slidable within the valve sleeve, the LP seal shaped to abut the valve seat in the LP sealed position; a spring surrounding a portion of the plunger shaft and positioned between the inner lip and the plunger, the spring configured to bias the plunger away from the valve seat, wherein the spring biases the LP seal to the open position responsive to the LP head and the LP seal partially collapses the spring to seal the LP canal opening responsive to the HP head.

18. The bypass valve assembly of claim 16, wherein the LP valve assembly further comprises: a bypass port in fluid communication with the inlet port; a LP stem coupled to the LP seal; a LP diaphragm coupled to the LP stem opposite the LP seal; and a LP valve chamber adjacent the LP diaphragm, the LP diaphragm moving the LP seal from the LP sealed position to the LP open position responsive to pressure in the LP valve chamber; a LP channel extending from the bypass port to the LP valve chamber; and a LP actuator comprising a LP plug positioned on the housing to plug the LP channel responsive to the LP head and movable to allow fluid communication between the LP valve chamber and the bypass port responsive to the HP head.

19. The bypass valve assembly of claim 16, wherein the LP valve assembly further comprises a LP stem coupled to the LP seal and the HP seal on opposing ends of the LP stem.

\* \* \* \* \*